No. 854,996. PATENTED MAY 28, 1907.
C. M. GARLAND.
DYNAMOMETER.
APPLICATION FILED DEC. 15, 1906.

2 SHEETS—SHEET 1.

Witnesses
Carl Stoughton
John S. Powers

Inventor
C. M. Garland
By
Shepherd & Parker
Attorneys

No. 854,996. PATENTED MAY 28, 1907.
C. M. GARLAND.
DYNAMOMETER.
APPLICATION FILED DEC. 15, 1906.

2 SHEETS—SHEET 2.

Witnesses
Carl Stoughton
John Powers

Inventor
C. M. Garland
By Shepherd Parker
Attorneys

UNITED STATES PATENT OFFICE.

CLAUDE M. GARLAND, OF URBANA, ILLINOIS.

DYNAMOMETER.

No. 854,996.  Specification of Letters Patent.  Patented May 28, 1907.

Application filed December 15, 1906. Serial No. 348,054.

*To all whom it may concern:*

Be it known that I, CLAUDE M. GARLAND, a citizen of the United States, residing at Urbana, in the county of Champaign and State of Illinois, have invented certain new and useful Improvements in Dynamometers, of which the following is a specification.

My invention relates to dynamometers and has for its object the provision of improved means for measuring the power generated in a prime mover.

A further object of the invention is the provision of a device of the character set forth, constructed in such manner that the power generated by prime movers of small capacity may be measured entirely by magnetic drag and also constructed in such manner that when it is desired to measure the power generated by a prime mover of greater capacity, a mechanical friction between the parts may be attained.

Further objects and advantages of the invention will be set forth in the detailed description which now follows.

Figure 1:
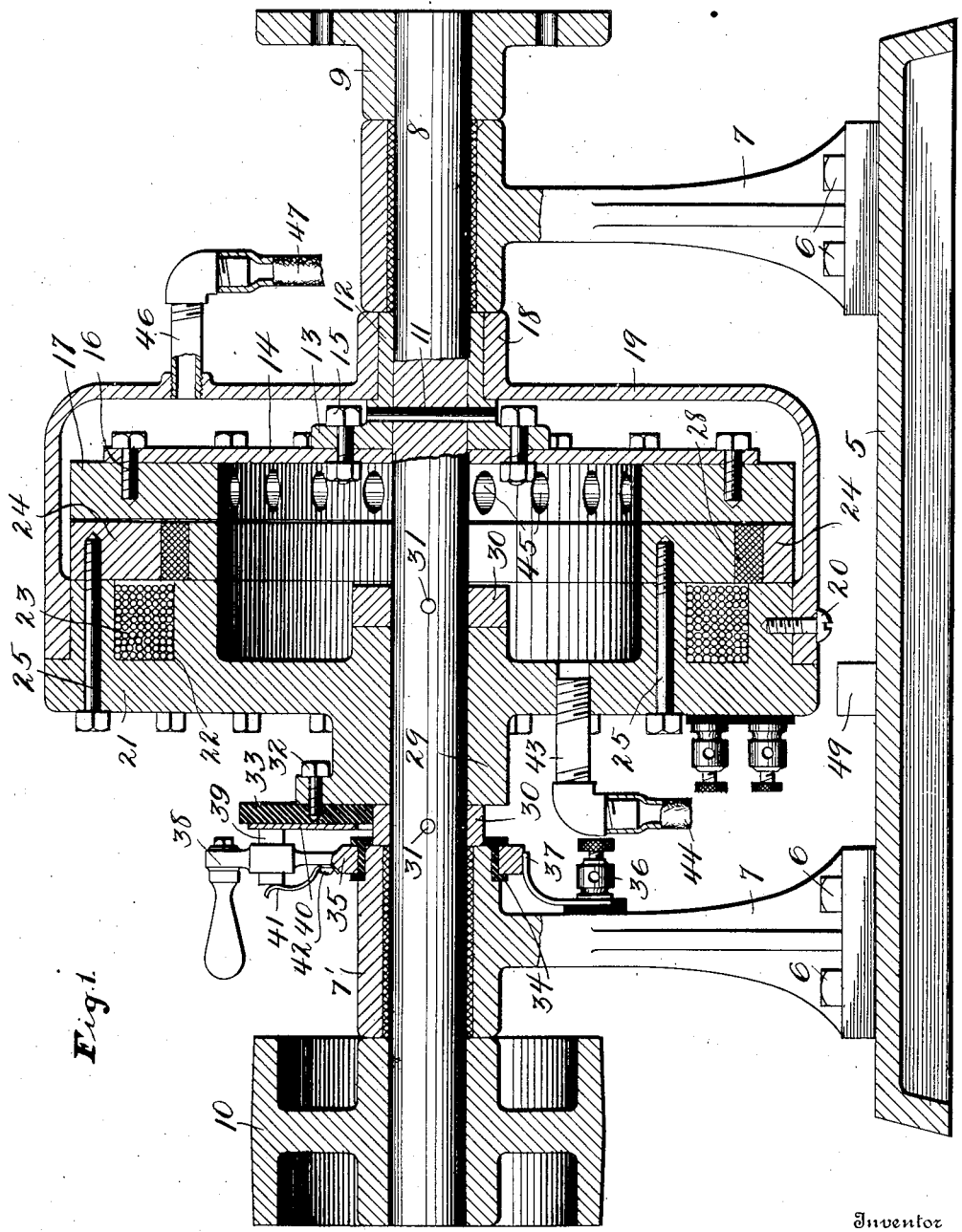
Figure 2:
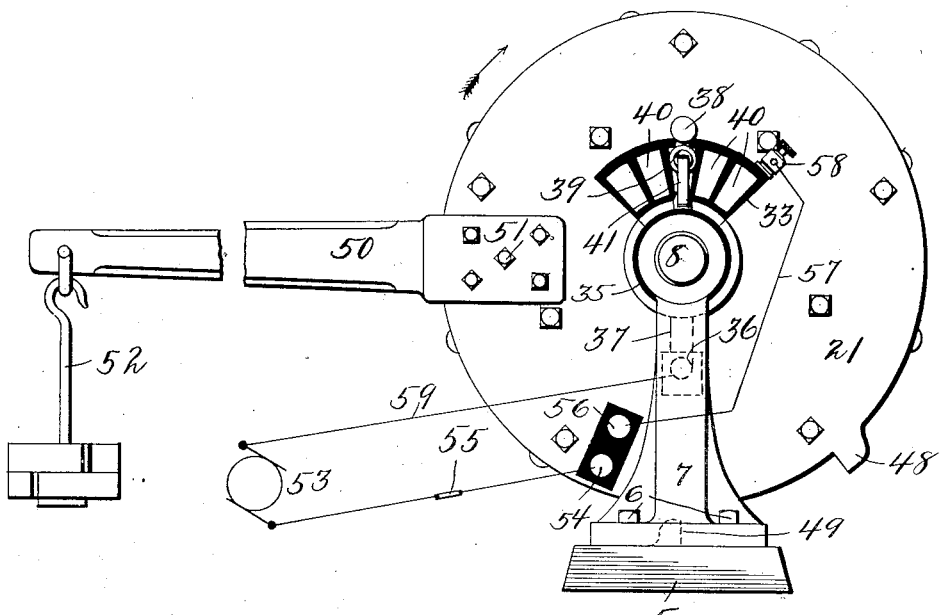
Figure 3:
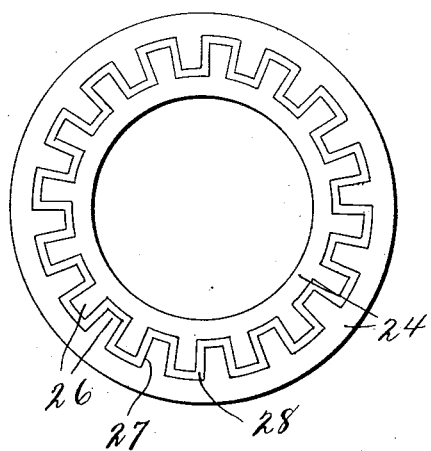
Figure 4:
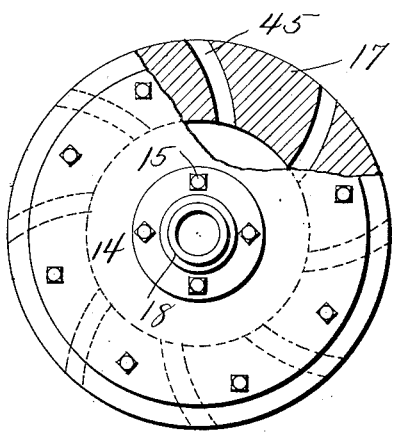

In the accompanying drawings: Figure 1 is a longitudinal vertical section of a dynamometer constructed in accordance with the invention, Fig. 2 is an end elevation of said dynamometer, Fig. 3 is a face view of a pair of pole plates hereinafter described, and, Fig. 4 is a view partly in elevation and partly in section of an armature hereinafter described.

Like numerals designate corresponding parts in all of the figures of the drawings.

Referring to the drawings, the numeral 5 designates a base. Secured to this base by bolts 6 are bearing standards 7. A shaft 8 is mounted to rotate in these standards and this shaft carries a coupling plate 9 which may be secured to a like coupling plate (not shown) to which motion is imparted from an engine, motor or other prime mover.

If it be desired to drive the shaft 8 by a belt instead of directly connecting said shaft to the prime mover, this may be done through a pulley 10.

Secured upon the shaft 8 by a pin 11 is a collar 12. This collar 12 has an upstanding flange 13 to which a spring plate 14 is secured by bolts 15. This plate is secured at its outer edges by bolts 16 to an armature ring 17. It will therefore be seen that when rotation is applied to the shaft 8, this armature ring will likewise be rotated. The collar 12 rotates in a boss 18 which is carried by a casing 19. This casing is secured by screws 20 to a field ring 21. This field ring has an annular recess 22 formed therein and field windings of wire 23 are wound in this recess. The pole plates 24 are secured to the field ring 21 by bolts 25. These pole plates are best illustrated in Fig. 3 and by referring to said figure, it will be seen that they are formed in two parts, each of said parts being provided with a series of radial projections 26 which mesh with each other and which leave a space 27 therebetween. This space is filled with Babbitt or other non-magnetic metal 28, the purpose of this arrangement being hereinafter set forth.

The shaft 8 rotates within a boss 29 of the field plate 21, said field plate being held against endwise movement upon said shaft by collars 30 which are secured to the shaft by pins 31. Secured to the boss 29 by a bolt 32 is an ordinary rheostat 33. A collar 34 of insulating material is carried upon the enlarged portion 7' of the left hand bearing 7 in Fig. 1. A ring 35 turns upon this collar, said ring being insulated by said collar from the bearing standard. A binding post 36 is carried by the standard 7 and a spring tongue 37 establishes communication between said binding post and the ring 35. Projecting from the ring 35 is a handle 38 in which a plunger 39 is disposed, said plunger riding over the resistance plates 40 of the rheostat. A spring 41, the lower end of which is secured to the handle 38 as at 42 normally tends to force this plunger toward the resistance plates of the rheostat. A water inlet pipe 43, together with a flexible hose 44 provides means for conducting water to the chamber formed between the inner plate 21 and the spring plate 14. The water passes from this chamber through openings 45 which are formed in the armature ring, to an outlet pipe 46, said outlet pipe also communicating with a flexible hose 47. A stop lug 48 is secured to or is carried by the field plate 21 and a similar lug 49 is secured to or carried by the base 5.

An arm 50 is bolted as at 51 to the field ring, said arm having a weight receiving member 52 of the usual construction at its outer end.

The electrical connections have been diagrammatically illustrated in Fig. 2. Referring to said figure, the numeral 53 designates a source of E. M. F. which is connected to a binding post 54. A switch 55 is adapted to break the circuit from the source of E. M. F.

to this binding post. The current passes from the binding post 54 through the field coils 23 to a binding post 56. This binding post is connected by a conductor 57 with one of the terminals 58 of the rheostat 33. The circuit is completed through this rheostat, the plunger 39, handle 38, ring 35, and spring 37 to the binding post 36, the binding post 36 being connected by a conductor 59 to the opposite pole of the source of E. M. F.

The operation of the device is as follows: We will assume that power is being applied to the shaft 8 from a prime mover of small capacity. After this prime mover gets up speed the current is turned on through the rheostat and with all of the resistance of said rheostat in circuit. This resistance is gradually cut out until the arm 50 is raised to a horizontal position by the magnetic drag between the armature ring 17 and the pole plates 24, this armature of course tending by the magnetic attraction between itself and the pole plates to turn said pole plates in the direction of its rotation, which would be in the direction of the arrow in Fig. 2. The movement of the field plate is limited by the stops 48 and 49. Additional weights may be applied to the member 52 to determine the power being generated by the prime mover. The pole plates are magnetized as well as the field plates and by referring to Fig. 2, it will be seen that these pole plates are constructed in such manner that the poles concentrate the magnetism about them, so that as the armature revolves about them, it revolves in a field of varying strength. The result of this is that eddy currents are set up in the armature and there is a magnetic drag between the armature and the pole plates which increases with the speed of the armature. Since the fields remain substantially at rest, this magnetic drag or torque exerted between the fields and the armature is large, so that small and medium loads may be measured entirely by this drag. It is designed to have the friction between the ring 35 and the insulating ring 34 great enough to cause the handle 38 to remain in any position to which it may be moved, even though the rheostat may move with relation to said handle. By virtue of this the machine will adjust itself to variations in the load. We will suppose for instance, that the handle 38 has been moved over the rheostat to so adjust the resistance of the field coils 23 that the torque between the pole plates and the armature is just sufficient to maintain the arm 50 in a horizontal position. We will now suppose that the speed of the prime mover is increased. This would increase the magnetic drag and would tend to raise the arm 50, but when this is done the rheostat 33 moves bodily toward the right in Fig. 2 with relation to the handle 38. This consequently throws more resistance into the circuit and reduces the field strength to such an extent that the arm 50 resumes its horizontal position. This same regulating effect would be had if the speed of the prime mover were to decrease and the arm 50 should drop below a horizontal position. This would move the rheostat 33 to the left in Fig. 2 with relation to the handle 38 and would decrease the resistance in the circuit, which would consequently increase the strength of the field coils and the resulting increase in the torque would again raise the arm 50 to a horizontal position. In measuring the power generated by prime movers of large capacity, however, it may be found that the magnetic drag alone is not sufficient to measure this power. If this be the case, more current will be sent through the field coils, which will increase the magnetic force between the armature and the pole plates, causing the armature which is mounted on a flexible sheet steel plate 14, to spring over and run against the pole plates, thereby producing a mechanical friction between the two. The heat generated by this mechanical friction and by the eddy currents in the armature, may be carried off by circulating water through the pipe 43, openings 45 and pipe 47, as will be readily understood.

From the foregoing description it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a device of the character described, a rocking member, a rotative member, means for producing electrical eddy currents between said members, means for measuring the magnetic drag between said members, and means for maintaining a water circulation between said members.

2. In a device of the character described, the combination with a rocking member, of a casing secured to said rocking member, a rotative shaft, a member fixed upon said shaft and rotating therewith, and electrical means for producing mechanical friction between said members.

3. In a device of the character described, the combination with a rocking member, of a casing secured to said rocking member, a rotative shaft, a member fixed upon said shaft and rotating therewith, electrical means for producing mechanical friction between said members, and means for maintaining a water circulation about said members.

4. In a device of the character described, the combination with a rotative shaft, of an armature mounted upon said shaft and rotating therewith, field members loosely mounted upon the shaft, rheostat resistance plates secured to said field members and moving therewith, a contact handle for said plates mounted upon a stationary object, and field coils with which said rheostat plates are in series.

5. In a device of the character described, the combination with a rotative shaft, of an armature mounted upon said shaft and rotating therewith, field members loosely mounted upon the shaft, rheostat resistance plates secured to said members and moving therewith, a contact member for said plates mounted upon a stationary object, field coils with which said rheostat plates are in series and a weighted arm secured to said rocking member.

6. In a device of the character described, the combination with a rotative shaft, of an armature mounted upon said shaft and rotating therewith, field members loosely mounted upon the shaft, rheostat resistance plates secured to said members and moving therewith, a contact handle for said plates mounted upon a stationary object, field coils with which said rheostat plates are in series, a weighted arm secured to said rocking member and means for limiting the movement of said rocking member in one direction.

7. In a device of the character described, the combination with a rotative shaft, of a field plate loosely mounted upon said shaft, field coils carried by said field plate, pole plates secured to said field coils and constructed in such manner as to produce a magnetic field of varying density, an armature carried by the shaft and rotating adjacent said field, and a weighted arm carried by the field plate.

8. In a device of the character described, the combination with a rotative shaft, of a field plate loosely mounted upon said shaft, field coils carried by said field plate, pole plates secured to said field coils and constructed in such manner as to produce a magnetic field of varying density, an armature carried by the shaft and rotating adjacent said field, a weighted arm carried by the field plate, a casing secured to the field plate and inclosing the armature, and means for maintaining a circulation of water through said casing.

9. In a device of the character described, the combination with a rotative shaft, of a field plate loosely mounted upon said shaft, field coils carried by said field plate, pole plates secured to said field coils and constructed in such manner as to produce a magnetic field of varying density, an armature carried by the shaft and rotating adjacent said field, a weighted arm carried by the field plate and a rheostat in series with the field coils, the body portion of said rheostat being movable with the field plate, and the contact handle thereof being mounted for adjustment to any selected position upon a stationary object.

In testimony whereof I affix my signature in presence of two witnesses.

CLAUDE M. GARLAND.

Witnesses:
   H. F. GODEKE,
   H. B. DIRKS.